Patented Jan. 9, 1934

1,943,171

UNITED STATES PATENT OFFICE 1,943,171

CEMENTATION MIXTURE FOR FERROUS METALS

Alexandre Folliet and Nicolas Sainderichin, Paris, France

No Drawing. Application October 23, 1930, Serial No. 490,813, and in France October 30, 1929

5 Claims. (Cl. 91—70.1)

The present invention relates to cementation mixtures for providing articles of ferrous metal with a protecting coating, a main object being to associate such coating with the ferrous metal in a highly intimate manner and to any degree of penetration.

A thorough investigation of the reducing reactions, in a closed vessel, at different temperatures, of such metals as aluminium and magnesium, mixed with various oxides, and in the presence of parts or objects of cast or other iron and steel, has led up to the present invention which results in the combining of the non-ferrous metal of a ferro-alloy, such as manganese, nickel, chromium, titanium, tungsten and the like, with cast or other iron and steel in some sort of solid solution.

With such an object, the invention consists in the improved cementation mixtures hereinafter described and particularly pointed out in the claims.

According to the present invention the parts to be treated, after scaling and cleaning if necessary, are embedded in a mixture of finely-divided aluminium or alloy of aluminium and magnesium and of the oxides or oxidized ores of the metals to be incorporated in the ferrous metal parts, to which is added a proportion of from 2 to 10 per cent. of chlorides of the same metals, or only one of them, as the oxides to be reduced, the mixture being then maintained in a closed vessel at a high temperature.

The proportion of active aluminium in the mixture employed depends on the quantity of oxygen in the oxides, that of the metallic chlorides referred to above varying according to circumstances from two to ten per cent. of the weight of the mixture.

The temperature in the closed vessel varies according to circumstances from 1000° to 1300° C., the metals liberated under the energizing action of the metallic chlorides combining by penetration with the parts or objects of iron or steel which are in intimate contact with the mixture.

The higher the percentage of metal oxides in the mixture and the longer the working temperature is maintained, the deeper will be the penetration.

The following substances in a suitable state of division may serve as the source of the metals to be incorporated in the ferrous metal parts:— for titanium, ilmenite; for manganese, calcined pyrolusite; for nickel, either calcined garnierite or roasted nickeliferous pyrites; for chromium, natural chrome iron ore, washed and dried; for tungsten, wolframite.

A mixture of these substances in suitable proportions, under the above conditions enables penetrating coatings of chrome-nickel, titanium-manganese and the like steels to be produced.

The fracture and micrographic examination of the products obtained show clearly the intermolecular penetration of the metallic elements liberated by the reaction.

As a filling material or complementary "inert support" in the receptacle used, the residuals of earlier operations may be utilized, after electromagnetic separation of the iron or magnetic metal in the case of certain oxides and ores employed.

We claim:

1. A cementation mixture for treating ferrous articles, comprising an oxide of a metal selected from a group consisting of titanium, manganese, nickel, chromium and tungsten, a chloride of the same metal and a quantity of finely-divided aluminium.

2. A cementation mixture for treating ferrous articles, comprising an oxide of chromium, a chloride of chromium and a quantity of finely-divided aluminium.

3. A cementation mixture for treating ferrous articles, comprising an oxide of titanium, a chloride of titanium and a quantity of finely-divided aluminium.

4. A cementation mixture for treating ferrous articles, comprising an oxide of nickel, a chloride of nickel and a quantity of finely divided aluminium.

5. A cementation mixture for treating ferrous articles, comprising crushed ilmenite, a chloride of titanium and a quantity of finely-divided aluminium.

ALEXANDRE FOLLIET.
NICOLAS SAINDERICHIN.